April 8, 1969  N. FELES ETAL  3,437,349
SEAT BELT ANCHORAGE
Filed Feb. 12, 1968  Sheet 1 of 2

INVENTORS
Nick Feles &
BY Rudi F. Quinting
David A. Greenlee
ATTORNEY

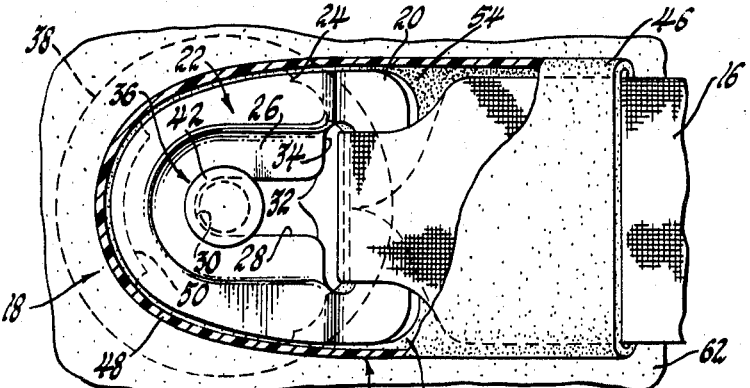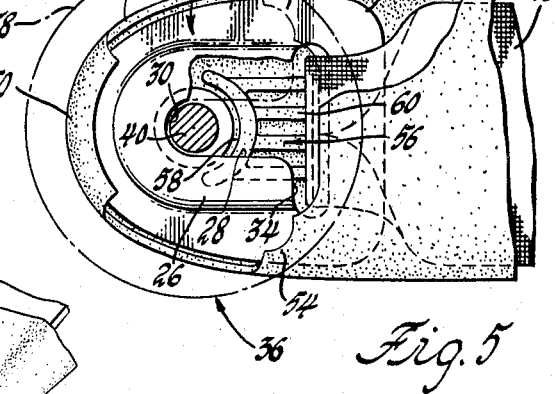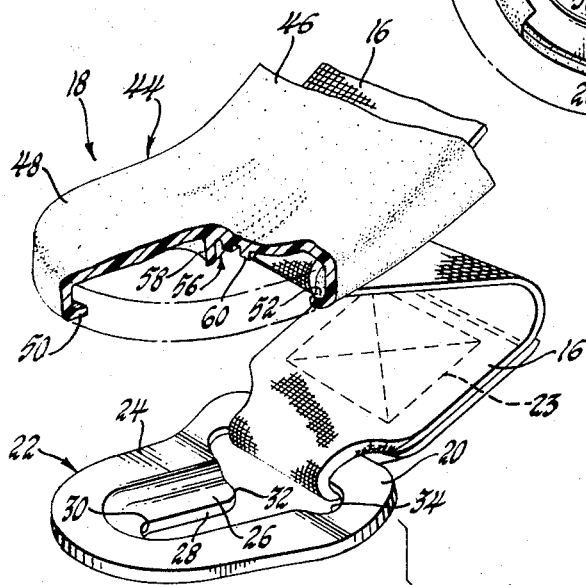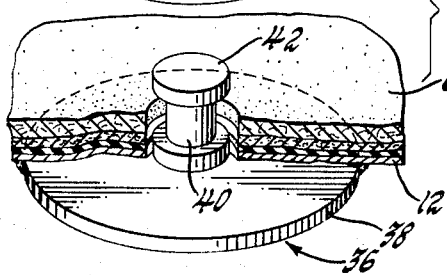

United States Patent Office 3,437,349
Patented Apr. 8, 1969

3,437,349
SEAT BELT ANCHORAGE
Nick Feles, Royal Oak, and Rudi F. Quinting, Clawson, Mich., assignors to General Motors Corporation, Detroit, Mich., a corporation of Delaware
Filed Feb. 12, 1968, Ser. No. 704,631
Int. Cl. B60r 21/10; A62b 35/00
U.S. Cl. 280—150    6 Claims

ABSTRACT OF THE DISCLOSURE

A seat belt attached anchor plate includes an open ended slot for receiving a vehicle body floor-mounted stud having an enlarged head. A flexible boot is retained on the anchor plate and on the seat belt end and includes a locking portion adjacent the slot open end to retain the stud within the slot.

---

This invention relates generally to seat belt assemblies and more particularly to an anchorage for anchoring a seat belt end to a vehicle body.

Seat belts are conventionally attached to the vehicle body by connecting the belt end to an apertured anchor plate that is bolted to a nut welded to the underside of the floor pan.

The other side of the floor pan is carpeted and it is often difficult to puncture the carpeting at the proper location, align the plate aperture with that of the nut, and bolt the plate to the nut through the carpeting.

This invention provides an improved seat belt anchorage which obviates the difficulties encountered with the conventional anchorage and which is easily and quickly assembled without tools.

In the preferred embodiment of the invention, a headed stud projects through an opening in the body floor pan and carpeting, and an anchor plate having an open slot fits under the head of the stud. The anchor plate is preassembled with a flexible boot which covers the plate, the end of the belt attached thereto, and the stud, and which further includes a locking portion engageable with the head of the stud to retain the stud within the slot.

It is, therefore, the primary object of this invention to provide a seat belt anchorage which may be easily assembled with a minimum expenditure of time.

This and further objects and features of this invention will become readily apparent upon reference to the following detailed description of the annexed drawings in which:

FIGURE 4 is a partially broken away top plan view of the anchorage of FIGURE 2;

FIGURE 5 is a sectional view taken generally on line 5—5 of FIGURE 2; and

FIGURE 6 is an exploded perspective view of the anchorage.

Figure 1:
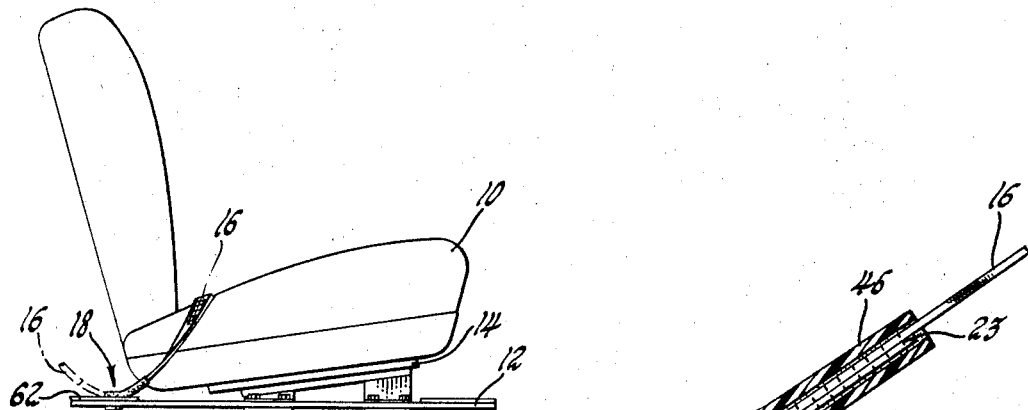
FIGURE 1 is a partial interior view of a vehicle body having a seat belt anchorage according to this invention.

Referring now to FIGURE 1 of the drawings, a vehicle body has a seat 10 mounted on the body floor pan 12 by a conventional seat adjuster 14. The seat 10 is provided with a conventional seat belt 16 having one end thereof mounted to floor pan 12 by a seat belt anchorage 18 according to this invention.

Figure 2:
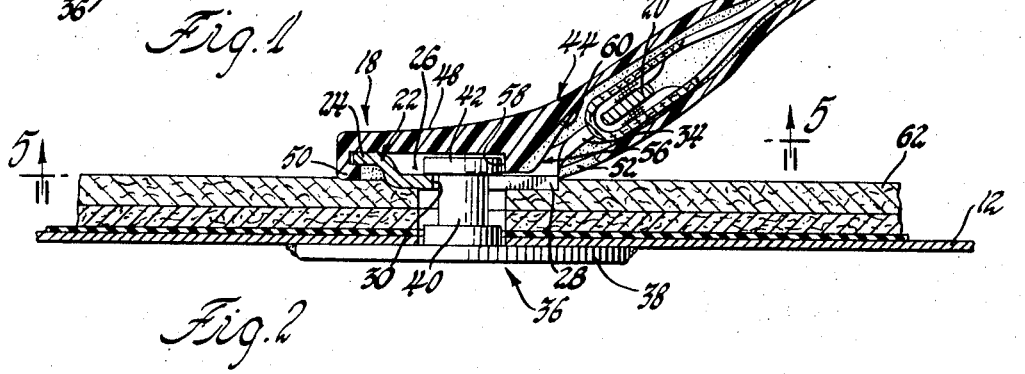
FIGURE 2 is an enlarged sectional view of the anchorage.

Referring now to FIGURES 2 and 6, the one end of the seat belt 16 is looped about an offset flange 20 of a steel anchor plate 22 and is sewn to itself at 23. As best seen in FIGURES 4 and 6, flange 20 is an angled part of a peripheral flange 24 of anchor plate 22 that is offset or elevated from a central flat dished portion 26. Central portion 26 includes a slot 28 having a closed end 30 and an open end 32. At its open end 32, slot 28 opens into a clearance aperture 34 extending transversely of anchor plate 22 and defined by the inner edge of flange portion 20 and the edge of central portion 26.

Referring again to FIGURES 2 and 6, a steel anchor stud 36 includes a circular base 38 which is welded or otherwise suitably secured to the underside of the vehicle floor 12. A cylindrical shank portion 40 extends from base 38 and terminates in a flanged cylindrical head 42. As best seen in FIGURE 5, the diameter of shank 40 is smaller than the width of slot 28 to permit passage of the stud into the slot. The diameter of head 42 is larger than the slot width to preclude vertical displacement of anchor plate 22 relative to stud 36. Central portion 26 and flange 20 are spaced so that clearance aperture 34 is sufficiently large to permit the passage of stud head 42 therethrough.

Referring now to FIGURES 2 and 6, a stiff, but resilient flexible plastic boot 44 has an upper sleeve portion 46 which envelopes the one end of belt 16 and part of flange 20. Boot 44 includes a flat spoon-shaped cover portion 48 which overlies anchor plate 22 and stud 36. Referring now to FIGURE 5, portion 48 includes a turned-under lip 50 at its left or free end which engages under the flange 24 of the anchor plate. At the sides of its other or right end, portion 48 includes a pair of turned-under lips 52 and 54 which engage the edges of the corners of flange 20. Thus, lips 50, 52 and 54 retain and locate boot 44 relative to anchor plate 22.

Referring again to FIGURES 2 and 6, portion 48 of the boot includes an integral depending locking portion 56 adjacent the slot open end 32. Locking portion 56 has an arcuate lock shoulder 58 facing slot 28 and a ribbed inclined cam portion 60 facing away from slot 28. As shown in FIGURES 2 and 5, locking shoullder 58 engages stud head 42 to prevent movement of the stud out of slot 28.

Figure 3:
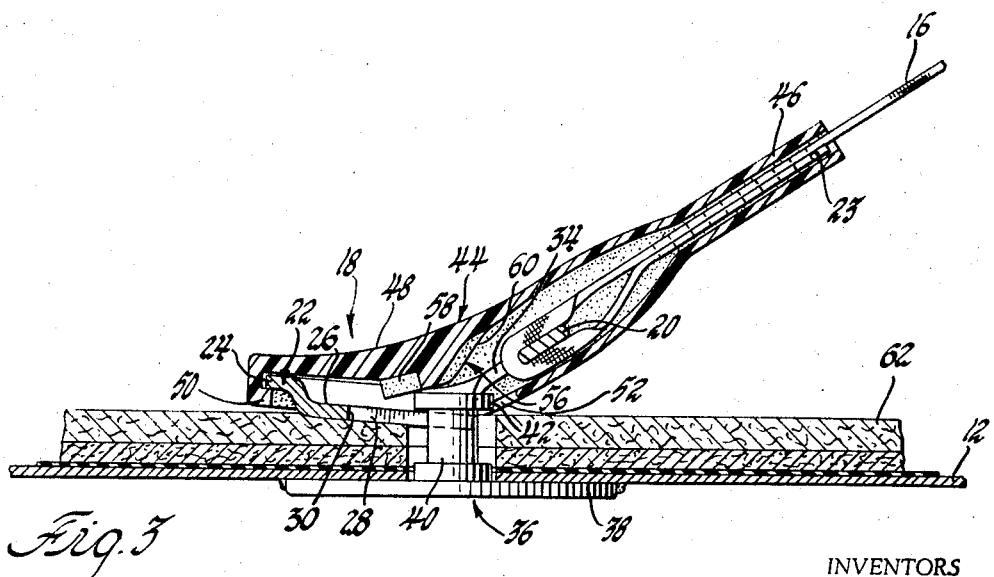
FIGURE 3 is a view similar to FIGURE 2, showing the anchorage partially assembled.

The simplified assembly of anchorage 18 will now be described with reference to FIGURES 2 and 3. After belt end 16 is attached to anchor plate flange 20 and boot 44 is fitted over the anchor plate and belt end, this assembly is located so that stud 36 is aligned with, but spaced from, the open end 32 of slot 28. The anchor plate is then moved toward the stud so that head 42 passes through clearance aperture 34 into engagement with cam surface 60. Upon further movement of the anchor plate, stud head 42 forces locking portion 56 upwardly, FIGURE 3, to enable entrance of stud shank 40 into slot 28. After shank 40 engages the closed end 30 of slot 28, the inherent resiliency of boot 44 will cause locking portion 56 to move to the FIGURE 2 position, wherein locking shoulder 58 engages stud head 42.

Any tensional pull on belt 16 will be transferred from anchor plate 22 to the stud through engagement of shank 40 with the slot closed end 30. Stud 36 cannot be disassembled from anchor plate 22 because boot lips 50, 52 and 54 maintain the boot locking portion 56 in the FIGURE 2 locked position.

Since stud shank 40 is cylindrical, anchor plate 22 is rotatable relative thereto. Thus the anchorage may be assembled with belt 16 facing rearwardly of the seat, as shown in phantom lines in FIGURE 1. After assembly, the anchor plate, belt and boot are then rotated 180° to the use position, shown in solid lines in FIGURE 1. As shown in FIGURE 2, assembly causes anchor plate 22 to depress the floor carpeting 62, the resiliency of which prevents rattling of the anchor plate against the stud.

Thus, it is readily apparent that assembly of the seat belt anchorage according to this invention is accomplished in a brief single step without tools.

We claim:
1. An anchorage for attaching a seat belt to a vehicle body comprising a stud mounted on the body and having a shank terminating in an enlarged head, an anchor plate mounting one end of the seat belt and including an open-ended slot having a width substantially the same as the shank width, the stud being insertable into the slot to anchor the plate and the belt to the body, and means mounted on the belt end and having a locking portion engageable with the stud for retaining the stud within the slot.

2. An anchorage for attaching a seat belt to a vehicle body, comprising
- a stud mounted on the body and having a shank terminating in an enlarged head,
- an anchor plate mounting one end of the seat belt and including a slot having closed and open ends, the slot at its closed end having a width greater than the stud shank width and smaller than the stud head width,
- the stud being insertable into the slot into engagement with the closed end thereof to anchor the belt to the body, and
- a flexible boot mounted on the belt and overlying the anchor plate, the boot having means retaining the boot to the anchor plate and having a locking portion adjacent the open end of the slot and engageable with the stud to lock the stud within the slot, the boot being deformable to move the locking portion to permit passage of the stud into the slot.

3. The anchorage of claim 2, wherein the stud shank is annular, thus permitting pivotal movement of the anchor plate relative to the stud.

4. The anchorage of claim 2, wherein the anchor plate includes a flat central portion having the slot, a strap mounting flange offset therefrom and extending transversely of the slot adjacent the open end thereof, and a clearance aperture defined by the central portion and the flange and opening into the slot, the clearance aperture being sufficiently large to permit passage of the stud head therethrough for insertion of the stud into the slot.

5. The anchorage of claim 4, wherein the boot locking portion includes a locking shoulder facing the slot and engageable with the stud head and includes a cam surface facing away from the slot, the cam surface being engageable by the stud head to move the locking portion and deform the boot sufficiently to enable insertion of the stud into the slot, the boot being sufficiently elastic to move the locking shoulder into engagement with the stud head after insertion of the stud into the slot.

6. The anchorage of claim 5, wherein the anchor plate includes a raised peripheral flange including the strap mounting flange; the boot includes a sleeve portion fitted over the strap end and a cover portion overlying the anchor plate; the locking portion depends from the cover portion; and the boot retaining means comprises at least one lip formed on the cover portion and engaging portions of the anchor plate peripheral flange to locate the locking portion relative to the open end of the slot.

References Cited

UNITED STATES PATENTS

| | | | |
|---|---|---|---|
| 1,428,358 | 9/1922 | Burbery | 24—222 |
| 3,298,739 | 1/1967 | Scruggs | 280—150 |

BENJAMIN HERSH, *Primary Examiner.*

ROBERT R. SONG, *Assistant Examiner.*

U.S. Cl. X.R.

297—385